United States Patent [19]

Lutzmann et al.

[11] Patent Number: 4,611,019

[45] Date of Patent: Sep. 9, 1986

[54] ENHANCED BARRIER COMPOSITIONS FROM POLYVINYL ALCOHOL

[76] Inventors: H. Harald Lutzmann, 2241 Briarwood Rd., Cleveland, Ohio 44118; Gerald W. Miller, 2165 Cable Car Ct., Cincinnati, Ohio 45244

[21] Appl. No.: 744,984

[22] Filed: Jun. 17, 1985

[51] Int. Cl.$^4$ .................................................. C08K 5/43
[52] U.S. Cl. ......................... 524/169; 524/104; 524/108; 524/132; 524/141; 524/156; 524/232; 524/503; 525/56
[58] Field of Search ............... 524/503, 104, 108, 132, 524/156, 169, 141, 232; 525/56

[56] References Cited

U.S. PATENT DOCUMENTS

| | | | |
|---|---|---|---|
| 3,516,960 | 6/1970 | Martins et al. | 524/381 |
| 3,560,464 | 2/1971 | Toyoshima et al. | 525/56 |
| 3,607,812 | 9/1971 | Takigawa et al. | 524/388 |
| 3,632,786 | 1/1972 | Nickerson | 524/503 |
| 3,980,605 | 9/1976 | Steigelmann et al. | 524/503 |
| 3,997,489 | 12/1976 | Coker | 525/57 |
| 4,243,074 | 1/1981 | Strutzel et al. | 428/36 |
| 4,261,473 | 4/1981 | Yamada et al. | 428/35 |
| 4,284,671 | 8/1981 | Cancio et al. | 525/56 |
| 4,289,830 | 9/1981 | Knott | 428/475.8 |
| 4,347,332 | 8/1982 | Odorzynski et al. | 525/58 |
| 4,427,825 | 1/1984 | Degrassi et al. | 525/56 |
| 4,451,599 | 5/1984 | Odorzynski et al. | 525/60 |
| 4,464,438 | 8/1984 | Lu | 525/57 |
| 4,529,666 | 7/1985 | Salzburg et al. | 524/503 |
| 4,536,532 | 8/1985 | Miller et al. | 524/169 |

FOREIGN PATENT DOCUMENTS

| | | | |
|---|---|---|---|
| 0039226 | 11/1981 | Europen Pat. Off. | 524/503 |
| 1903280 | 10/1970 | Fed. Rep. of Germany | 524/503 |
| 0042863 | 1/1967 | Japan | 525/56 |
| 0028138 | 3/1976 | Japan | 524/503 |
| 0131246 | 8/1982 | Japan | 524/503 |
| 1077351 | 7/1967 | United Kingdom | 525/56 |

*Primary Examiner*—Joseph L. Schofer
*Assistant Examiner*—T. M. Reddick
*Attorney, Agent, or Firm*—John F. Jones

[57] ABSTRACT

The addition of small amounts of selected polyamides or polyesters to plasticized, melt extrudable polyvinyl alcohol homopolymer provides a composition with lower permeability to oxygen and other fixed gases.

2 Claims, No Drawings

4,611,019

ENHANCED BARRIER COMPOSITIONS FROM POLYVINYL ALCOHOL

This invention relates to novel compositions which possess enhanced ability as a barrier to oxygen and other fixed gases, particularly at high relative humidities. These compositions can be used for food packaging and the like which may be exposed to relative humidities is in the range 50–100%. Protection of the contents of packages containing oxygen sensitive products for shelf lives of more than one year are desired, and the containers must exhibit very low permeability to oxygen. Of the polymer systems which have been considered as barrier packaging materials, polyvinyl alcohol is probably the best for oxygen protection, provided that its degree of hydrolysis is 95% or greater.

Generally, the use of a single polymer in an extruded film does not provide sufficiently long package life to materials susceptible to oxygen deterioration, and multi-ply films have been developed for these uses. These multi-ply products are made by post lamination or coextrusion near the melt temperatures of selected polymeric materials to provide optimum life to pre-packaged goods sensitive to oxygen deterioration. Polyvinyl alcohol compositions are known to be outstanding in their oxygen impermeability at low relative humidities, i.e., below 50%, but they suffer significant change in this property, particularly at humidities above 70%. Consequently, the ability to decrease the permeability of the oxygen gas through polyvinyl alcohol even further at relative humidities above 70% is a desirable goal.

The novel compositions of this invention consist of (i) a melt extrudable polyvinyl alcohol homopolymer (usually a hydryolyzed vinyl acetate homopolymer) with a degree of hydrolysis greater than 95% which has been plasticized with from 7 to 15% by weight based on the polyvinyl alcohol homopolymer, of a plasticizer selected from the group consisting of aromatic sulfonamides, N,N-dimethyl amides of fatty acids, polyols, alkylene carbonates, aromatic phosphates and phosphites, aromatic sulfonates, alkyl pyrrolidones, and admixtures thereof, and (ii) a polyamide, such as nylon 66, or a polyester, such as poly(butylene terephthalate), in the amount of from 0.5% to 4.5%, based upon the weight of the melt extrudable polyvinyl alcohol.

The compositions described above exhibit lower permeabilities to oxygen gases at high relative humidities, i.e., greater than 70%, than the melt extrudable polyvinyl alcohol compositions without these polymer additives.

BACKGROUND FOR THE INVENTION

In the U.S. patent application, Ser. No. 568,940, filed 1/9/84, now U.S. Pat. No. 4,536,532, it has been disclosed that polyvinyl alcohol homopolymer can be made melt extrudable by the addition of certain organic, non-hydroxylic plasticizers, selected from the class of aromatic sulfonamides, aromatic sulfonates, aromatic phosphates, aromatic phosphites, alkylene carbonates, alkyl pyrrolidones, dimethyl amides of fatty acids, and admixtures thereof. These compositions exhibit a significant oxygen barrier to oxygen, even at elevated humidities.

In U.S. Pat. No. 3,607,812 Takigawa discloses the melt extrusion of a conventional polyvinyl alcohol with the use of glycerine in a water-free environment, where the polyvinyl alcohol utilized has a degree of hydrolysis of 97% and a degree of polymerization of 700–1500.

In U.S. Pat. No. 4,451,438 Knott and Odorzynski have used substantial amounts of polyethyl oxazoline, polyvinyl pyrrolidone, polyvinyl formaldehyde and polyamides having melting point temperatures below 400 degrees F. as blends with the copolymer of ethylene/vinyl alcohol to affect easier processing. They note only that the oxygen permeability of such blends, using between 5 and 20% by weight of plasticizing polymer, does not rise above 1 cc/square meter/24 hrs. at 0% humidity and 73 degrees F. Their information does not disclose any permeability values for gases.

In U.S. Pat. No. 4,464,438, Lu describes blends of polyvinyl alcohol and ethylene/vinyl alcohol copolymer with the use of processing aids, such as polyamide, polyurethane or polyoxazoline for producing opaque, paper-like films. There is not mention of improvement in impermeability properties with the use of these processing aids, in the range 5–20%.

In U.S. Pat. No. 3,516,960, are given various benzoate esters, including salicylate esters, that provide some improvement in oxygen permeability. However, these materials are all monomeric and they are used in water cast films, rather than melt extrudable systems.

In U.S. Pat. No, 4,284,671, are provided data on the oxygen permeability benefits of adding polyester copolymer to ethylene/vinyl alcohol copolymer. No change in oxygen permeability is perceived until the copolyester concentration reaches 25% by weight, and preferably near 50%, in order to provide a composition with impermeability to oxygen approaching ethylene/vinyl alcohol copolymer.

In U.S. Pat. No. 4,289,830 is disclosed the use of small amounts of phenolic monomers for improvement in oxygen permeability, with the best increase in protection being 42% of the ethylene/vinyl alcohol copolymer. The values cited are very high in light of other literature references for ethylene/vinyl alcohol copolymer.

In U.S. Pat. No. 4,003,963 are disclosed blends of vinyl chloride polymers with ethylene/vinyl alcohol copolymer in the amount of 10–30 percent, in conjunction with carboxyl moieties in the PVC.

All of the cited references use monomeric additives or use large amounts of polymers cited to have effects that are diluent on the impermeability of polyvinyl alcohol polymers and copolymers to oxygen gas. This invention relates the significant improvement in already high barrier compositions to oxygen permeability by the addition of only small amounts of selected polymers in the range 0.5% to 4.5%. The low impermeabilities of melt extrudable polyvinyl alcohol compositions are further reduced with the addition of Nylon 6, 66, and poly(butylene terephthalate).

DESCRIPTION OF THE PREFERRED EMBODIMENT

A polyvinyl alcohol homopolymer, whose solution viscosity at 20 deg C. in water at 4% concentration ranges from 2 to 30 cps, and whose degree of hydrolysis is at least 95%, is mixed in a twin screw compounding extruder with a selected plasticizer, whose concentration is 7 to 15%, to provide a melt extrudable polyvinyl alcohol homopolymer when the plasticizer is selected from the class of materials such as aromatic sulfonamides, polyols, aromatic sulfonates, aromatic phosphates and phosphites, N,N-dimethylamides of fatty acids, alkylene carbonates, alkyl pyrrolidones, and admixtures thereof. These compositions exhibit excellent impermeability to oxygen gas. The use of substantially water free compositions of this invention is advantageous for the manufacture of extruded articles, such as film, sheet and bottles, to produce clear, bubble free products. When 1% of poly(butylene terephthalate), by weight, is added to the melt extrudable polyvinyl alcohol composition, the oxygen permeability decreases by a factor approaching ten. Decreases in oxygen permeation are also observed when using a crystalline polyamide, such as Nylon 66.

It is significant to the practice of this invention that the melt extrudable polyvinyl alcohol compositions, having gone through a heat forming step or where the compositions have otherwise been heated to a temperature above 200 deg C., are then allowed to cool at a rate sufficiently slow to allow the formation of enhanced barrier properties, as described in U.S. pat. application, Ser. No. 568,940.

Poly(butylene terephthalate), identified as PBT, is the preferred polymer additive because of its effect of reducing the oxygen permeability to such low levels at high relative humidities. These polyesters, generically noted as alkylene terephthalates, are usually in the molecular weight range of 12,000 to 55,000, exhibit rapid crystallization, and may be copolymers of poly(alkylene terephthalate), or blends of this polymer with other polyesters and polyamides. Other polyesters may be poly(ethylene terephthalate) or polyether-containing polyesters and blends, sold under the commercial trade name of Hytrel.

Polyamides are also effective agents for reducing the oxygen permeability of melt extrudable poly(vinyl alcohol). Polyamides with molecular weights of about 15,000 to 30,000, such as nylon 66 and nylon 6 are effective in reducing the rate of permeation at high relative humidities. Included among these polyamides are also nylon 11, nylon 12, nylon copolymers such as 6,10 and 6,12 as well as grafted nylon polymers, such as those described in U.S. Pat. No. 4,174,358.

Those polymeric additives which have such a pronounced effect on the oxygen permeability at high relative humidities, i.e., over 75%, are crystalline, high melting polymers.

Those plasticizers which may be used for rendering polyvinyl alcohol homopolymer melt extrudable are classes of compounds falling within the group including N, N-dialkyl substituted C10 to C22 fatty acid amides, N-alkyl alkaryl and alkaryl sulfonamides, N-alkyl pyrrolidones, alkaryl phosphites, alkaryl phosphates, alkylene carbonates, sulfonated alkyl phenols, and polyhydric plasticizers, such as glycerine, cyclohexane dimethanol, or other glycols.

Specific members of the plasticizers mentioned above are: Santicizer 8, a mixture of ortho- and para-isomers of N-ethyl toluene sulfonamide, available from the Monsanto Co.; sulfonated alkyl phenols sold under the trademark MESAMOLL, available from Mobay Chemical; N-cyclohexyl pyrrolidone, available from GAF Corporation; propylene carbonate, available from the Texaco Co.; glycerine; cyclohexanedimethanol, available from the Eastman Chemical Co.; dimethyl amides of oleic acid, sold under the trademark "HALLCOMID M 18-ol, available from the C. P. Hall Co. These and other embodiments will be further understood by referring to the following examples.

EXAMPLE I

A polyvinyl alcohol homopolymer, characterized by a solution viscosity at 4% of 15 centipoises, and a degree of hydrolysis exceeding 95%, is mixed with an aromatic sulfonamide, such as Santicizer 8, a mixed ortho and para isomer of N-ethyl toluene sulfonamide, in a ratio of nine parts of polyvinyl alcohol to one part of Santicizer 8. To this mixture are added 0.5% of a hindered phenol antioxidant (Ethyl 330), and 0.05 percent of a lubricant (ethylene-bis-stearamide), prior to extrusion on a twin screw extruder. The oxygen permeability of a film from this composition when measured on a Modern Controls Oxtran instrument at 73 deg F. and 80% relative humidity is 0.4 cc.mil/100 sq. in. 24 hrs. atm.

Using the same melt extrudable polyvinyl alcohol composition, adding 1% by weight of poly(butylene terephthalate), and extruding on a compounding extruder into films produced samples whose oxygen permeability at 80% relative humidity were 0.04 cc.mil/100 sq. in. 24 hrs. atm.

EXAMPLE II

When the same composition as noted in Example I utilizes 3% Nylon 66 rather than 1% PBT as an additive to the melt extrudable polyvinyl alcohol, and the composition is extruded on a twin screw extruder, the oxygen permeability of a film from this composition when measured on an Oxtran instrument at 73 deg F. and 80% relative humidity is 0.2 cc. mil/100 sq. in. 24 hrs. atm.

Other modifications can be made such as those listed in the Table.

TABLE

| Examples of Additive Effects on Polyvinyl Alcohol | | | | | |
|---|---|---|---|---|---|
| PVOH | Santicizer 8 | Antiox. | Lube | Other | OPV |
| 2700 g. | 300 g. | 15 g. | 1.5 g. | None | 0.4 |
| 2700 g. | 300 g. | 15 g. | 1.5 g. | Aspirin* | 0.8 |
| 2700 g. | 300 g. | 15 g. | 1.5 g. | PBT | 0.04 |

*Aspirin is acetylsalicylic acid.
OPV = oxygen permeability in cc. mil/100 sq. in. day atm. at 80% relative humidity and 73 deg F.

Having described this invention, we claim:

1. A melt extrudable composition consisting essentially of a mixture of a polyvinyl alcohol homopolymer whose degree of hydrolysis is greater than 95% and having a molecular weight range which spans the solution viscosity range of 2 to 30 centipoises at 4% concentration in water at 20 degrees C., from 7 to 15% by weight based on the polyvinyl alcohol homopolymer of a plasticizer selected from the group consisting of aromatic sulfonamides, polyols, aromatic sulfonates, aromatic phosphates and phosphites, N,N-dimethyl amides of fatty acids, alkylene carbonates, alkyl pyrrolidones, and admixtures thereof, and from 0.5 to 4.5% by weight based on the weight of the polyvinyl alcohol homopolymer of a polyamide having a molecular weight of from 15,000 to 30,000 selected from the group consisting of nylon 66, nylon 6, nylon 11, nylon 12, nylon 6,10 copolymer, nylon 6,12 copolymer and grafted nylon.

2. The composition of claim 1 wherein the plasticizer is a mixture of ortho and para isomers of N-ethyl toluene sulfonamide and the polyamide is nylon 66.

* * * * *